Jan. 1, 1952     D. G. SMELLIE     2,580,615

SUCTION CLEANER

Filed Jan. 6, 1950

INVENTOR.
Donald G. Smellie
BY
Harry S. [signature]
ATTORNEY.

Patented Jan. 1, 1952

2,580,615

UNITED STATES PATENT OFFICE 2,580,615

SUCTION CLEANER

Donald G. Smellie, Canton, Ohio, assignor to The Hoover Company, North Canton, Ohio, a corporation of Ohio Application January 6, 1950, Serial No. 137,172
In Great Britain February 18, 1948

9 Claims. (Cl. 183—58)

This invention relates to suction cleaners and more particularly to a new and improved filter shaking mechanism.

More specifically, the present invention involves a shaker mechanism which is operable to shake a filter bag vigorously and abruptly and yet automatically relieves the filter of the tension of the shaker spring immediately upon the conclusion of the shaking operation. Thereafter, a relatively light spring functions to hold the filter walls extended for efficient filter operation. In the illustrative embodiment herein disclosed, depression of an actuating lever through a small arc disengages a lock-out for the shaker spring allowing the latter to tension the filter. At the same time, movement of the lever gradually collapses the filter in opposition to the shaker spring and then suddenly releases the filter for abrupt tensioning to dislodge dirt. Release of the lever by the operator permits the light spring to return the parts to their normal positions wherein the shaker spring is automatically locked out.

Accordingly, it is an object of the present invention to provide a novel suction cleaner, and more particularly a cleaner having a new and improved filter shaking mechanism associated therewith.

Another object is the provision of a novel filter shaker for use on suction cleaners.

A further object is the provision of a filter shaker in which the shaker spring is normally ineffective to tension the filter.

Still another object of the invention is the provision of means other than the shaker spring to hold the filter in an extended position normally for efficient filter operation.

Yet another object is the provision of a snap-acting filter shaker mechanism employing a strong shaker spring and including lock-out means for rendering the spring ineffective to tension the filter except during a shaking operation.

Further objects and advantages of the invention will become apparent from the following specification and drawings in which.

Figure 1:
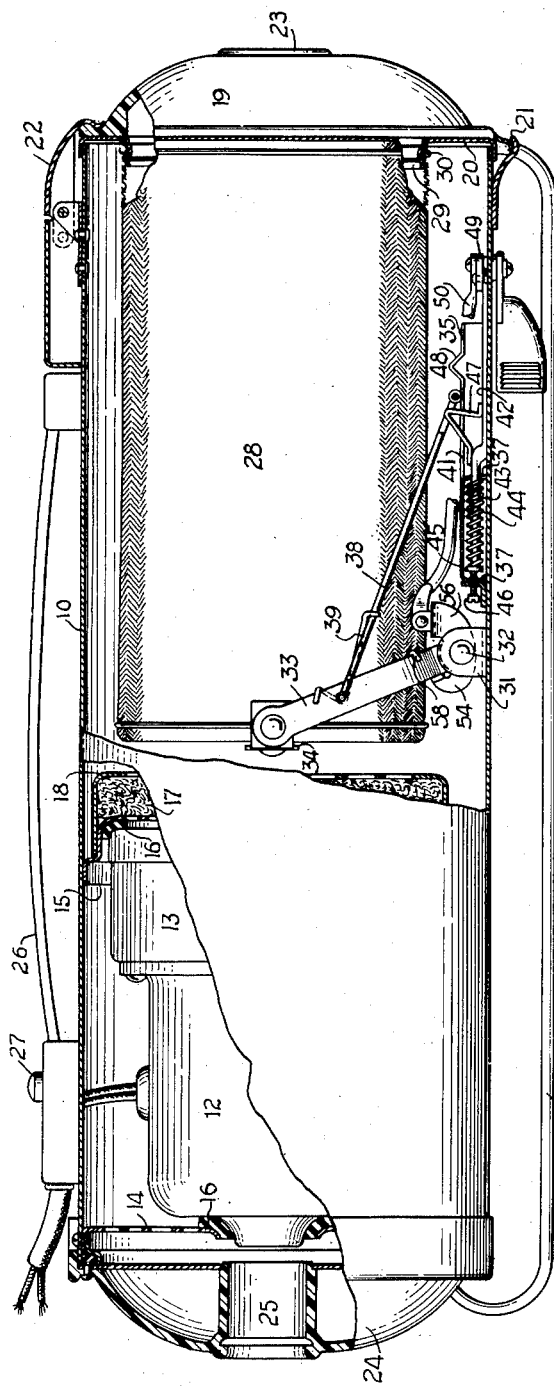
Figure 1 is a side view, partly in section of a suction cleaner incorporating the invention.

This application is a continuation-in-part of my application for Letters Patent, Serial No. 733,297, filed on March 8, 1947, and now abandoned.

The invention may be incorporated in a suction cleaner of the tank type having a horizontally extending casing 10 supported upon a pair of runners 11 for convenient movement of the cleaner over the floor. A suction unit of any well known type is suitably supported within the casing adjacent one end thereof. This unit comprises a driving motor 12 and a multistage fan unit 13. The opposite ends of this unit are shown as suspended in soft rubber bushings 16—16 carried by a perforated partition 14 and an imperforate collar 15. In accordance with customary practice, a final filter pad 17 is removably secured over the inlet of fan 13 by a perforated cap 18.

A suction inlet end cap 19 seats in an airtight manner against detachable annular flange 20 closing the right hand end of cleaner casing 10. As shown, the lower end of cap 19 is provided with a separable hinge connection 21 while its upper end is clamped in place as by toggle clamp 22. An air inlet opening 23 in the end cap functions as a coupling for the usual flexible suction hose, not here illustrated.

The exhaust end of the cleaner casing is closed by a second end cap 24 which is preferably semi-permanently connected to the casing in an airtight manner. A flexible hose may be coupled to exhaust air opening 25 when it is desired to use the cleaner as a blower.

The usual carrying handle 26 extending along the top of the cleaner casing incorporates a control switch 27 for motor 12. The filter preferably comprises a simple cylindrical bag 28 of fabric or other air pervious material the open inlet end of which is secured about the periphery of inturned flange 29 of annular ring 20 as by a wire or other clamp 30.

Figure 2:
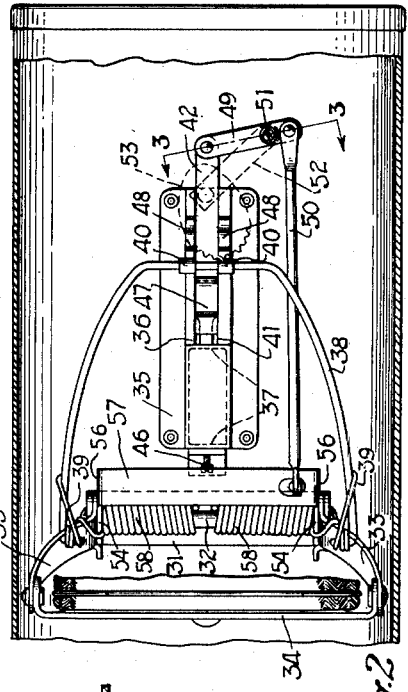
Figure 2 is a top plan view of the shaker mechanism.
Figure 3:
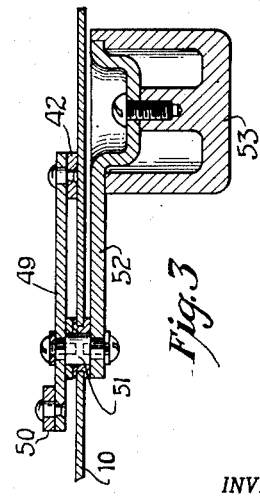
Figure 3 is a sectional view taken on line 3—3 of Figure 2.

Reference will now be made to Figures 1 to 3 for an understanding of the filter shaker mechanism per se. A strap 31 riveted to the lower side of casing 10 has upturned ends supporting a pivot pin 32. The lower end of a pair of filter supporting links 33—33 are journaled on pin 32 and extend upwardly along either side of filter 28. The upper ends of the links are pivotally connected to a U-shaped member 34 the center of which may be suitably detachably connected to a spider located on the interior of the filter bag.

A plate 35 formed to provide a longitudinally extending guideway 36 is permanently secured to the lower side of the cleaner casing forwardly of strap 31. Tabs 37—37 are struck downwardly from the top side of the guideway for a purpose which will become apparent later. A wire bail 38 has its opposite ends pivoted to the upper portion of links 33 and is biased clockwise by a light spring 39. The mid-portion of the bail may be provided with a pair of rollers 40—40 positioned to roll along the top surface of guideway 36 adjacent the edges of slot 41.

A rigid link 42 is mounted for reciprocation in guideway 36 and its rear end is preferably swaged into a rod 43. A light compression spring 44 is carried by rod 43 and acts between the forward tab 37 and a nut 45 on the end of the rod. Accordingly, spring 44 urges strip 42 to the left against an adjustable stop screw 46 carried by left-hand tab 37. A latch member 47 is rigidly secured to strip 42 and projects upwardly through slot 41. The forward face of member 47 is normally positioned just rearwardly of bail 38 so as to engage the bail and move it forwardly when strip 42 is moved forwardly. The rear face of the latch member is cammed to pass under the bail following a bag shaker operation. In order to release the bail from latch 47 after the filter has been collapsed to the desired extent, the upper surface of guideway 36 is struck upwardly to form a pair of cam surfaces 48 positioned in the path of the rollers on bail 38. Thus, as the bail is moved forwardly by member 47 to collapse the filter, cams 48 act on rollers 40 and lift the bail out of engagement with the latch.

The forward end of link 42 is pivotally connected to a lever having its opposite end pivotally connected to a thrust rod 50. Lever 49 is non-rotatably secured to a pin 51 journaled in the lower side of cleaner casing 10 as more clearly shown in Figure 3. Non-rotatably secured to the exterior side of pin 51 is a manually operable shaker lever 52 carrying a foot pedal or handle 53 on its outer end.

The purpose of thrust rod 50 is to operate a lock-out device for the filter shaking spring and this structure will now be described. The lock-out may take various forms but, as here shown, comprises a pair of bell cranks journaled on pivot pin 32 adjacent filter supporting links 33—33. The rear arms 54 of the bell crank carries a tab on its upper end positioned to the rear edge of links 33. The forwardly extending arms 56—56 of the bell crank are interconnected by a strip 57 extending parallel to and forwardly of pivot 32. Strip 57 is pivotally connected to the rear end of thrust rod 50.

A pair of comparatively stiff torsion springs 58—58 encircle pin 32 and one end of each bears against links 33 urging them counterclockwise while the other end of the spring bears against strip 57 in a manner to urge the bell crank clockwise. It will therefore be apparent that so long as no force is applied to thrust rod 50, the torsion springs act to maintain the bell crank in engagement with links 33, a position in which the torsion springs, though in a stressed condition, are ineffective to move either links 33 or thrust rod 50 in either direction.

Operation

Normally the parts are in the position illustrated in Figures 1 to 3. In this position, the lock-out device prevents the shaker springs 58—58 from applying any tensioning force through links 33 to filter 28. Spring 44, however, acts through the linkage to hold the filter in an extended position under no or very slight tension. It is also to be noted that the manual operating lever 52—53 is in its normal retracted position of rest and that bail 38 is positioned just forwardly of latch member 47. Hence, the relationship of member 47 and bail 38 is such as to provide a normally closed releasable connection. This connection is held closed by the construction of the parts and by springs 39 until it is opened when cams 48 force bail 38 to over-ride the end of member 47.

Let it be assumed that the cleaner has been in operation and that dirt has accumulated on the inner wall of the filter to an extent reducing its filtering efficiency. To restore the efficiency of the filter, the operator upends the cleaner onto end cap 19. If it is desired to remove the dirt from the filter, the operator first removes the end cap before upending the cleaner onto a dirt receptacle. Cleaning of the filter is then accomplished merely by depressing foot pedal 53. The sequence of events when this is done is as follows: Rotation of the foot lever through a small angular arc rotates lever 49 in the same direction. In so doing, member 42 is moved to the right carrying bail 38 along and collapsing the filter. At the same time, thrust rod 50 is moved to the left rotating the lock-out counterclockwise thereby allowing the full stress of the torsion springs 58 to act on links 33. Thus, the stress on the torsion springs is increased from both ends thereof. However, this stress is not transmitted to the filter itself until the releasable connection is opened by cams 48 releasing the bail from latch member 47. At this instant, all the energy stored in the shaker springs is effective on links 33 to snap the filter taut abruptly. It is to be noted that so long as the operating lever is held depressed, thrust rod 50 will hold the lock-out means disengaged from links 33. Hence, the lock-out does not interfere with the tensioning of the filter until the operating lever is released.

As soon as the operator removes his foot or hand from handle 53 of the operating lever, spring 44 reverses the linkage mechanism and moves member 47 of the releasable connection rearwardly until it passes under and interlocks with bail 38. At the same time, thrust rod 50 is moved to the right until tab 55 abuts links 33 and thereby locks spring 58 out of operation until a subsequent operation of the mechanism. Accordingly, it will be apparent that the filter is maintained normally only under the slight, if any, tension imposed by the spring 44 as determined by the adjusted position of screw 46.

From the foregoing, it will be apparent that the present invention provides a very simple shaker mechanism which is positive in operation and highly efficient in restoring the filter to its original operating efficiency. The arrangement incorporates a powerful filter shaking spring which is operative to tension the filter only momentarily during the shaking operation. At all other times the shaker spring is locked out of operation and no appreciable tension is applied to the filter wall thereby greatly prolonging the life of the filter.

From the foregoing it will be apparent a suction cleaner has been disclosed having a filter shaker mechanism presenting numerous features and advantages not heretofore obtainable. Although only a single illustrative embodiment has been described it is to be understood that various modifications will suggest themselves to those skilled in the art without departure from the principles of this invention.

I claim:

1. In combination with a suction cleaner having a filter mounted therein; shaker mechanism for said filter normally holding said filter extended under no appreciable tension and operable to collapse said filter and tension it abruptly comprising; a manually operable linkage secured to one end of said filter; a spring normally holding said linkage in position to support said filter in said extended position; a relatively strong filter shaking spring; releasable lock-out means normally rendering said spring inoperative to tension said filter; a normally closed releasable connection; and means for opening said releasable connection when said filter is collapsed to a predetermined position; said mechanism being operable to release said lock-out means, tension said filter shaker spring and collapse said filter whereby said shaker spring is effective to tension said filter abruptly when said releasable connection opens.

2. The combination defined in claim 1 including a manually operable lever for said shaker mechanism, said lever being supported on said cleaner and extending to the exterior thereof.

3. The combination defined in claim 1 including means for automatically closing said releasable connection when said shaker mechanism is released following a shaking operation, and said lock-out means being automatically operative to render said shaker spring ineffective to tension said filter when said first mentioned spring returns the filter to said normal extended position.

4. In combination with a suction cleaner having a filter mounted therein; shaker mechanism for said filter normally holding said filter extended but operable to collapse said filter and tension it abruptly comprising; a movable support for one end of said filter; a manually operable lever; members providing a first and a second parallel connection between said support and said lever; a normally closed releasable connection in said first parallel connection; means for opening said releasable connection when said filter has been collapsed to a predetermined position; and a relatively strong shaker spring in said second connection including lock-out means normally rendering said spring ineffective to tension said filter but operable to tension the filter when said lever is moved to collapse said filter.

5. The combination defined in claim 4 including relatively weak spring means for restoring said mechanism to its inoperative position following depression of said lever during a filter shaking operation.

6. In combination with a suction cleaner having a filter mounted therein, a shaker mechanism for said filter comprising, a pivoted link supporting one end of said filter, a pivoted bell crank, a filter shaking spring connected between one arm of said bell crank and said link and urging said link into engagement with a second arm of said bell crank, a manually operable lever, a normally engaged releasable connection between said link and said lever for collapsing said filter, means interconnecting said lever and said bell crank operable by said lever to stress said spring and to move said second arm out of engagement with said link, and means for disengaging said releasable connection when said filter has been collapsed to a predetermined position whereby the energy stored in said spring is available to snap said filter taut abruptly to dislodge dirt therefrom.

7. The combination defined in claim 6 including spring means for returning said lever to its initial position after a filter shaking operation and for re-engaging said releasable connection.

8. The combination defined in claim 7 characterized in that said last mentioned spring means is operable to restore the normal relationship between said link and said bell crank wherein said filter shaking spring is ineffective to tension said filter.

9. In combination with a suction cleaner having a filter mounted therein, shaker mechanism for said filter comprising, a support for one end of said filter movable between a fully extended position and a collapsed position of said filter, a linkage for operating said support including a lever carried by said cleaner, a normally closed releasable connection between said support and said lever, means for opening said releasable connection when the filter has been collapsed to a predetermined position, a second connection between said support and said lever including a spring for biasing said filter support to said extended position of said filter and lock-out means for said spring normally rendering said spring ineffective to tension said filter, said lock-out means being movable by said lever to a position in which said spring biases said filter toward the extended position thereof.

DONALD G. SMELLIE.

REFERENCES CITED

The following references are of record in the file of this patent:

UNITED STATES PATENTS

| Number | Name | Date |
| --- | --- | --- |
| 2,498,102 | White | Feb. 21, 1950 |